US008494450B2

(12) United States Patent
Jalil et al.

(10) Patent No.: US 8,494,450 B2
(45) Date of Patent: Jul. 23, 2013

(54) METHOD AND SYSTEM FOR MANAGING COMMUNICATION IN A FREQUENCY DIVISION MULTIPLE ACCESS (FDMA) COMMUNICATION NETWORK

(75) Inventors: Rehan Jalil, San Jose, CA (US); Mustafa Ergen, Oakland, CA (US)

(73) Assignee: WiChorus, Inc., Santa Clara, CA (US)

( * ) Notice: Subject to any disclaimer, the term of this patent is extended or adjusted under 35 U.S.C. 154(b) by 652 days.

(21) Appl. No.: 11/754,383

(22) Filed: May 29, 2007

(65) Prior Publication Data
US 2007/0297363 A1     Dec. 27, 2007

Related U.S. Application Data

(60) Provisional application No. 60/809,705, filed on May 30, 2006.

(51) Int. Cl.
H04B 15/00 (2006.01)
(52) U.S. Cl.
USPC .......... 455/62; 455/63.1; 455/63.3; 455/63.4; 455/450; 455/464; 455/509; 455/522; 370/329; 370/330; 370/341; 370/344; 370/318
(58) Field of Classification Search
USPC ................. 370/276–282, 287, 294, 295, 314, 370/339, 328–337, 341–348, 431–463; 455/422.1, 450–455, 464, 509, 62–63.4, 455/71, 113, 447, 114.2, 278.1, 296, 522, 455/127.1
See application file for complete search history.

(56) References Cited

U.S. PATENT DOCUMENTS

| 5,666,649 | A  | * | 9/1997  | Dent ............................ 455/445 |
| 6,493,331 | B1 | * | 12/2002 | Walton et al. ................. 370/341 |
| 6,496,700 | B1 | * | 12/2002 | Chawla et al. ............. 455/435.2 |
| 6,993,333 | B2 | * | 1/2006  | Laroia et al. .................. 455/436 |
| 7,636,334 | B2 | * | 12/2009 | Gerlach ....................... 370/330 |
| 7,664,193 | B2 | * | 2/2010  | Jalali et al. ..................... 375/267 |
| 7,746,839 | B2 |   | 6/2010  | Jalil et al. |
| 8,036,198 | B2 |   | 10/2011 | Jalil et al. |
| 2003/0142656 | A1 | * | 7/2003  | Padovani et al. ............. 370/347 |
| 2003/0207696 | A1 | * | 11/2003 | Willenegger et al. ......... 455/522 |
| 2003/0214918 | A1 | * | 11/2003 | Marinier ...................... 370/310 |
| 2004/0219942 | A1 | * | 11/2004 | Zhang .......................... 455/522 |
| 2005/0141450 | A1 |   | 6/2005  | Carlton et al. |
| 2005/0169229 | A1 |   | 8/2005  | Cho et al. |
| 2006/0003767 | A1 | * | 1/2006  | Kim et al. ..................... 455/436 |
| 2006/0018347 | A1 |   | 1/2006  | Agrawal |

(Continued)

*Primary Examiner* — Patrick Edouard
*Assistant Examiner* — Ronald Eisner
(74) *Attorney, Agent, or Firm* — Hamilton, Brook, Smith & Reynolds, P.C.

(57) ABSTRACT

The present invention provides method and system for managing communication in a Frequency Division Multiple Access (FDMA) communication network. The method comprises reserving a first segment downlink time slot and/or a first segment uplink time slot for a first segment in the FDMA communication network. The first segment belongs to a plurality of segments used in the FDMA communication network. Thereafter, a communication is scheduled between a base station and one or more mobile stations based on the first segment downlink time slot and/or the first segment uplink time slot. The base station uses the first segment at a high power level for the communication. Further, the one or more mobile stations can be scheduled for an uplink transmission, based on a location of the one or more mobile stations. A mobile station can be located in one of a plurality of sectors of a cell area of a base station.

17 Claims, 5 Drawing Sheets

U.S. PATENT DOCUMENTS

| | | |
|---|---|---|
| 2006/0072501 A1 | 4/2006 | Toshimitsu et al. |
| 2006/0239264 A1* | 10/2006 | Kang et al. .................... 370/390 |
| 2007/0253367 A1 | 11/2007 | Dang et al. |
| 2007/0297363 A1 | 12/2007 | Jalil et al. |
| 2009/0010344 A1 | 1/2009 | Jalil et al. |
| 2009/0080375 A1 | 3/2009 | Jalil et al. |
| 2010/0220696 A1 | 9/2010 | Jalil et al. |
| 2012/0008579 A1 | 1/2012 | Jalil et al. |

* cited by examiner

METHOD AND SYSTEM FOR MANAGING COMMUNICATION IN A FREQUENCY DIVISION MULTIPLE ACCESS (FDMA) COMMUNICATION NETWORK

RELATED APPLICATION

Benefit is claimed under 35 U.S.C. 119(e) to U.S. Provisional Application Ser. No. 60/809,705, entitled "Method and System for Single Frequency Network in OFDMA Systems with Sectoral Antenna" by Rehan Jalil et al., filed May 30, 2006, which is herein incorporated in its entirety by reference for all purposes.

FIELD OF THE INVENTION

The present invention generally relates to a Frequency Division Multiple Access (FDMA) communication network, and more specifically, to a method and system for managing communication in the FDMA communication network.

BACKGROUND OF THE INVENTION

Mobile communication industry has observed an exponential increase in number of users in recent times. Consequently, the cost of limited frequency spectrum has increased proportionally. This increase in cost has compelled service providers to develop frequency reuse techniques to maximize usage of frequencies. An example of such technique is a Frequency Division Multiple Access (FDMA) communication network.

However, many of such frequency reuse techniques suffer from interference problems due to increasing number of users. Interference reduces the quality of transmission in a communication network and therefore, results in a decrease in Quality of Service (QoS) of a communication network.

Some existing techniques, called Dynamic Channel Assignment (DCA) techniques are used for reducing interference. In DCA techniques, cell areas of base stations in a communication network do not have fixed number of channels. In such techniques, channels are dynamically allocated to cells according to interference and service demand. However, such techniques are difficult to implement and may be unstable under service heavy load.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
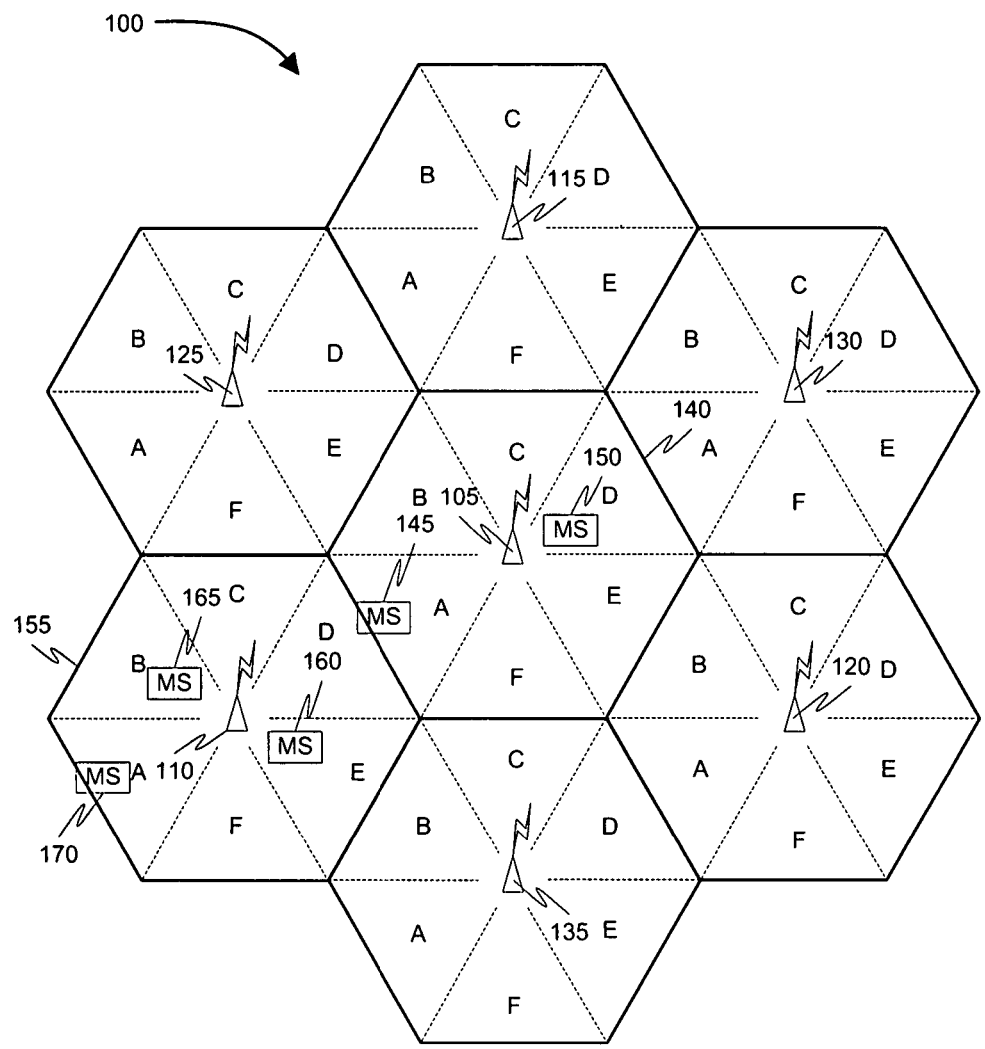
FIG. 1 illustrates an exemplary representation of a Frequency Division Multiple Access (FDMA) communication network in accordance with various embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to method and system for managing communication in a Frequency Division Multiple Access (FDMA) communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the present invention described herein may be comprised of one or more conventional transaction-clients and unique stored program instructions that control the one or more transaction-clients to implement, in conjunction with certain non-transaction-client circuits, some, most, or all of the functions of a method for managing communication in a FDMA communication network. The non-transaction-client circuits may include, but are not limited to, a radio receiver, a radio transmitter, signal drivers, clock circuits, power source circuits, and user input devices. As such, these functions may be interpreted as steps of methods for managing communications in a FDMA communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to various embodiments, the present invention provides method and system for managing communication in a FDMA communication network. More particularly, the present invention provides method and system for reducing interference in the FDMA communication network. The FDMA communication network may comprise one or more of, but not limited to, an Orthogonal Division Multiple Access (OFDMA) communication network, an Interleaved Frequency Division Multiple Access (IFDMA) communication network, etc. Typically, a FDMA communication network comprises a plurality of base stations and a plurality of mobile stations. Each base station services a cell area in which one or more mobile stations can be located. A mobile station can be located in an area, hereinafter known as a first area, of the cell area which does not overlap with any other neighboring cell areas. A mobile station may also be located in an area, herein after known as the second area, of the cell area which overlaps with a portion of at least one neighboring cell areas. A mobile station located in the second area of a cell area may be able to communicate with two or more base stations. Such mobile stations located in the second area may, therefore, cause interference in neighboring base stations in an uplink transmission. The method of the present invention manages communication in FDMA communication network for reducing interference by a mobile station located in the second area of a cell area.

Referring to the drawings and in particular to FIG. 1, an exemplary representation of a FDMA communication network 100 is shown, in accordance with various embodiments of the present invention. FDMA communication network 100 comprises a base station 105, a base station 110, a base station 115, a base station 120, a base station 125, a base station 130 and a base station 135. Each of base station 105, a base station 110, a base station 115, a base station 120, a base station 125, a base station 130 and a base station 135 can communicate using a plurality of segments. The plurality of segments are portions of a frequency allocated to the plurality of base stations. For instance, the OFDMA mode of IEEE 802.16d/e based communication network provides three segments, each of which can be allocated to a set of base stations. The set of base station can use the segment allocated to it at a high power level, and the other two segments at a low power level. For the sake of clarity, only three segments are considered hereinafter for FDMA communication network 100. However, it will be apparent to a person skilled in art that method and system of the present invention is applicable to scenarios where more than three segments are used.

FDMA communication network 100 can use a first segment, a second segment and a third segment for establishing communication between a plurality of base stations and a plurality of mobile stations. Specifically, base station 105 may communicate with one or more mobile stations in a cell area 140 using the first segment at a high power level and the second segment and the third segment at a low power level. Using the first segment at a high power level can enable base station 105 to communicate with a mobile station 145, which is located in a second area of cell area 140. Similarly, using either the second segment or the third segment or both, base station can communicate with a mobile station 150 located in a first area of a cell area 140.

Further, in order to reduce interference, the OFDMA mode of IEEE 802.16 d/e facilitates adjacent base stations, that share a portion of their cell areas, to use different frequencies at high power level. Hence, a mobile station located in an overlapping area between two or more base stations can communicate with each base station using different frequencies, thus reducing interference. The method of managing communication in the FDMA communication network for further reducing interference, is explained in detail in conjunction with FIG. 2 to FIG. 4 below.

Referring back to FIG. 1, base station 110, base station 115 and base station 120 may communicate using the second segment at the high power level and the first segment and the third segment at the low power level. Further, base station 125, base station 130 and base station 135 may communicate using the third segment at the high power level and the first segment and the second segment at the low power level. It will be apparent to a person skilled in art that a suitable arrangement, other than the arrangement of the exemplary FDMA communication network 100 can be used for implementing the method and system of the present invention. For example, in a scenario when FDMA communication network 100 comprises more than three segments.

Mobile station 145 is located in cell area 140 of base station 105 and in a cell area 155 of base station 110. Mobile station 145 can communicate with base station 105 using the first segment and can communicate with base station 110 using the second segment. Further, a mobile station 160 and a mobile station 165 are located in a first area, non-overlapping area, of cell area 155. Consequently, mobile station 160 and mobile station 165 can communicate with base station 110 using second segment. It will be apparent to a person skilled in art that there may be more than one mobile stations residing in each of the first area and the second area of a cell area of a base station, and all such embodiments are within the scope of the present invention.

Figure 2:
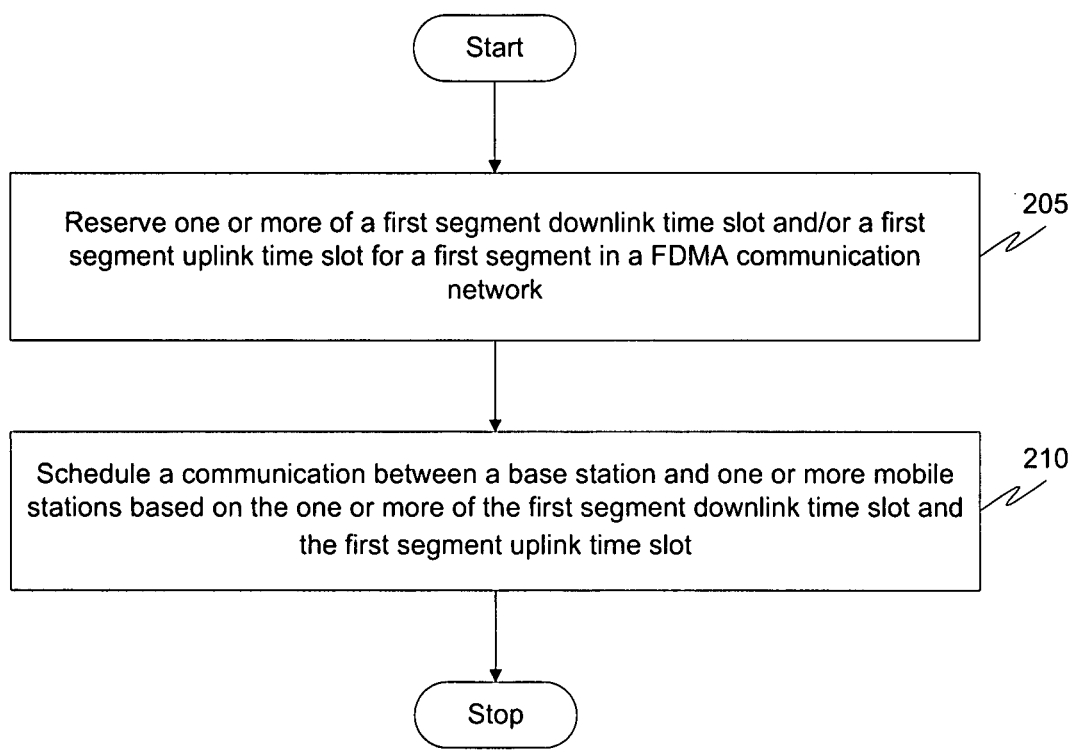
FIG. 2 illustrates a flow diagram of a method for managing communication in a FDMA communication network in accordance with an embodiment of the present invention.

Referring now to FIG. 2, a flow diagram of a method for managing communication in a FDMA communication network is shown, in accordance with an embodiment of the present invention. Communication in the FDMA communication network is typically carried out on a frame. A frame generally, comprises a preamble symbol, a downlink sub-frame and an uplink sub-frame. A plurality of segments in the FDMA communication network can be used in the same frame. Further, a base station can also use more than one segment for communication at different power levels.

For managing communication in the FDMA communication network, a first segment downlink time slot and/or a first segment uplink time slot is reserved for a first segment, at step 205. The first segment belongs to the plurality of segments used in the FDMA communication network. The first segment downlink time slot corresponds to a time slot in the downlink sub-frame when the first segment can be used, and the first segment uplink time slot corresponds to a time slot in the uplink sub-frame when the first segment can be used. In a similar manner, downlink time slots and/or and uplink time slots are reserved for other segments in the FDMA communication network. For instance, a second segment downlink time slot and/or a second segment uplink time slot corresponding to a second segment can also reserved, at step 205. The second segment downlink time slot corresponds to a time slot in the downlink sub-frame when a second segment can be used and the second segment uplink time slot corresponds to a time slot in the uplink sub-frame when the second segment can be used.

In an embodiment of the present invention, a low power downlink time slot and/or a low power uplink time slot is also reserved. The low power downlink time slot corresponds to a downlink transmission, and the lower power uplink time slot corresponds to an uplink transmission. In the low power downlink time slot, each base station of FDMA communication network can communicate with one or more mobile stations using some or all of the plurality of segments at a low power level. Similarly, in the low power uplink time slot one or more mobile stations can communicate with the plurality of base stations of the FDMA communication network using some or all of the plurality of segments at a low power level. Thus, only the mobile stations in the first areas corresponding to the plurality of base stations may be able to communicate during the low power downlink time slot and the low power uplink time slot. Since, communication for only the mobile stations in the first areas of the plurality of base station is facilitated, interference in the downlink transmission and uplink transmission is reduced during the low power downlink time slot and the low power uplink time slot. For instance, each of mobile station 160 and mobile station 165 may be able to communicate with base station 110 during the low power downlink time slot and the low power uplink time slot. However, mobile station 170 may not be able to communicate with base station 110 during the low power downlink time slot and the low power uplink time slot. Similarly, mobile station 150 may be able to communicate with base station 105, however, mobile station 145 may not be able to communicate with base station 105. Further, for communications in each of the low power downlink time slot and the low power uplink time slot, any or all of the first segment, second segment and the third segment can be used. Therefore, each of mobile station 160 and mobile station 165 can use any of the first segment, the second segment and the third segment for communication in the low power downlink time slot and the low power uplink time slot. Similarly, mobile station 150 can use any of the first segment, the second segment and the third segment for communication in the low power downlink time slot and the low power uplink time slot.

In another embodiment of the present invention, a high power downlink time slot corresponding to Multicast and Broadcast Service (MBS) symbol may also be reserved. The high power downlink time slot corresponds to a downlink transmission from the plurality of base stations to a plurality of mobile stations in the FDMA system. In the high power downlink time slot, each base station of the FDMA communication network can communicate with one or more mobile stations using the plurality of segments at a high power level. Thus, downlink transmission to mobile stations located in the second areas corresponding to the plurality of base stations can be established using any or all of the first segment, the second segment and the third segment during the high power level downlink transmission. For instance, during the high power downlink time slot, mobile station 145 can receive downlink transmission from both base station 105 and base station 110 simultaneously and on any of the first segment, the second segment and the third segment. Further, one or more of mobile station 150, mobile station 160, mobile station 165 and mobile station 170 can receive the downlink transmission during the high power downlink time slot.

After reserving of the first segment downlink time slot and the first segment uplink time slot for the first segment at step 205, a communication between a base station and one or more mobile stations is scheduled based on the first segment downlink time slot and/or the first segment uplink time slot, at step 210. During the first segment downlink time slot, a base station communicates with one or more mobile stations using the first segment at a high power level. The one or more mobile stations can be located anywhere in the cell area of the base station. Simultaneously, neighboring base stations can use the first segment at a low power level for downlink transmission. This reduces downlink interference in a mobile station which is located on an overlapping area between a cell area of the base station and a cell area of a neighboring base station.

For instance, during the first segment downlink time slot, base station 105 can use the first segment at high power level for downlink transmission to mobile stations in the first area, for example mobile station 150, as well as mobile stations in the second area, for example mobile station 145. At the same time, neighboring base stations such as base station 110, base station 115, base station 120, base station 125, base station 130 and base station 135 can use the first segment at a low power level for downlink transmission to mobiles stations in the first areas of the neighboring base stations, for example mobile station 160 and mobile station 165. Hence, during the first segment downlink time slot, mobile station 145 can receive packets from base station 105, but not from base station 110. Base station 110 can, however, send packets to mobile station 160 and mobile station 165 during the first segment downlink time slot.

Similarly, during the second segment downlink time slot, base station 110, base station 115 and base station 120 can communicate using the second segment at a high power level. Hence, base station 110 can send packets to a mobile station 170, which is in a second area of base station 110, using the second segment at a high power level. During the second segment downlink time slot, base station 105, base station 125 and base station 135, which are adjacent to base station 110, can use the second segment at a low power level to communicate with mobile stations in the corresponding first areas. For instance, during the second segment downlink time slot, base station 105 can send packets to mobile station 150 using the second segment, but not to mobile station 145.

Further, during the first segment uplink time slot, a base station schedules one or more mobile stations for uplink transmission using the first segment. For instance, base station 105 can schedule to receive uplink transmission from mobile station 145 and mobile station 150 on the first segment at the first segment uplink time slot. One or more neighboring base stations, however, schedule one or more mobile stations in the cell areas of the neighboring base stations, based on the location of the one or more mobile stations. In an embodiment of the present invention, a ranging information or a signal strength information from a base station is used for determining a location of a mobile station in a cell area of the base station. A method of scheduling one or more mobile stations for uplink transmission is explained in detail in conjunction with FIG. 3 and FIG. 4.

Figure 3:
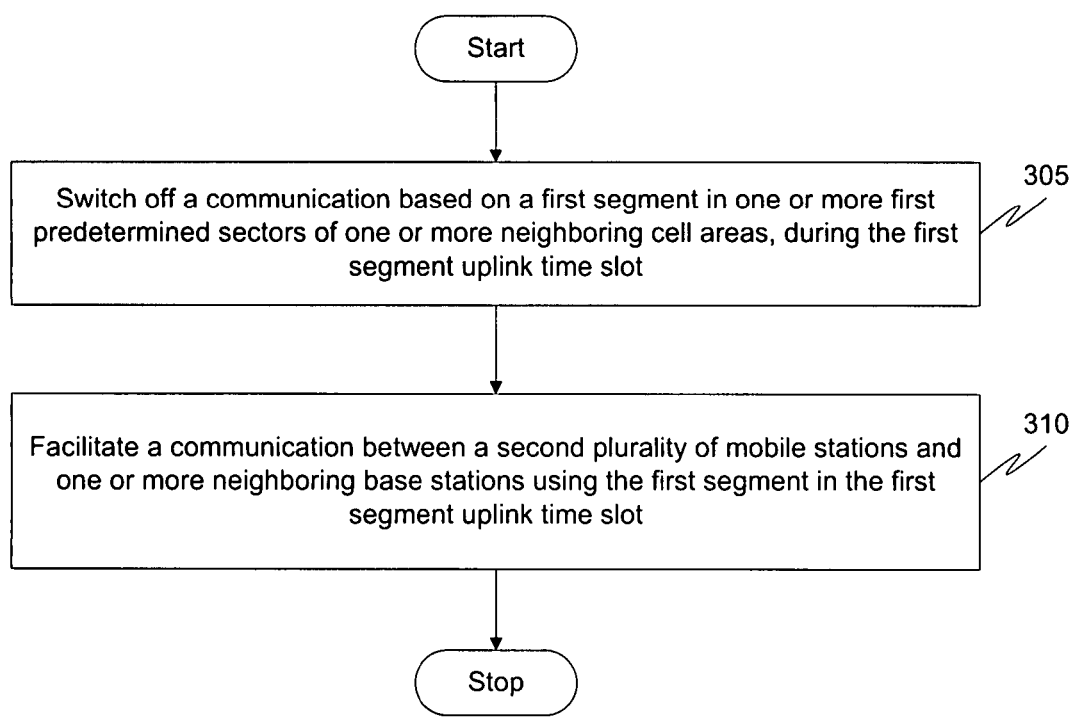
FIG. 3 illustrates a flow diagram of a method for reducing interference in an uplink transmission in accordance with an embodiment of the present invention.

Referring now to FIG. 3, a flow diagram of a method for reducing interference in an uplink transmission is shown, in accordance with an embodiment of the present invention. As mentioned in FIG. 2 a first segment downlink time slot and a first segment uplink time slot is reserved for the first segment. During the first segment downlink time slot, a base station uses the first segment at a high power level for downlink transmission and one or more neighboring base stations of the base station can use the first segment at a low power level for downlink transmission. However, for uplink transmission, since the possibility of interference is higher, an embodiment of the present invention, in accordance with FIG. 3, provides a method for reducing the uplink transmission.

Cell areas of one or more base stations in the FDMA communication network are partitioned into a plurality of sectors, in accordance with the embodiment of the present invention. For instance, referring back to FIG. 1, cell area 140 of base station 105 is partitioned into sector A, sector B, sector C, sector D, sector E and sector F. Cell areas of other base station are partitioned in a similar manner, as shown in FIG. 1. Those skilled in the art will realize the number of sectors of a cell area depends on number of neighboring base stations of a base station. FIG. 1 depicts six neighboring base stations and six sectors for the sake of clarity, and other alternate embodiments are within the scope of the present invention.

Referring back to FIG. 3, a base station can schedule one or more mobile stations for uplink transmission using the first segment, for the first segment uplink time slot. At step 305, during the first segment uplink time slot, a communication based on the first segment is switched off in one or more predetermined sectors of one or more neighboring cell areas. The one or more predetermined sectors are such that an overlapping is present between at least one sector of the one or more predetermined sectors and one or more sectors of the base station.

For instance, referring back to FIG. 1 any mobile station in cell area 140 of base station 105 can be scheduled for uplink transmission using the first segment during the first segment uplink time slot. Thus, mobile station 145 and mobile station 150 can be scheduled for uplink transmission to base station 105 at the first segment uplink time slot. However, one or more mobile stations in cell areas of the one or more mobile stations. Thus, at step 305, during the first segment uplink time slot, a communication based on the first segment uplink time slot, based on the location of the one or more mobile stations. Thus, at step 305, during the first segment uplink time slot, a communication based on the first segment is switched off in sector A, sector C and sector E of base station 125. This is because sector E overlaps with a portion of cell area 140 of base station 105, which uses the first segment for uplink transmission. Those skilled in the art will realize that, sector A and sector C overlap with other cell areas of base stations (not shown in FIG. 1) which use the first segment for uplink transmission during the first segment uplink time slot.

It will be apparent that communication based on the first segment can be switched off in sector B, sector D and sector F of base station 110, base station 115 and base station 120 and in sector A, sector C and sector E of base station 125, base station 130 and base station 135 during the first segment uplink time slot. In an embodiment of the present invention, instead of switching off the communication completely in the one or more predetermined sectors, only the mobile stations which are very close to the one or more neighboring base stations can be scheduled for uplink transmission using the first segment.

Further, a communication between a plurality of mobile stations belonging to sectors other that the one or more predetermined sectors and the one or more neighboring base stations is facilitated at step 310. The plurality of mobile stations are located in sectors of the one or more neighboring base stations where an overlapping is absent between the sectors and any of the plurality of sectors of the base station. As mentioned earlier, a location of a mobile station can be obtained from a raging information or a signal strength information obtained from a base station.

Referring back to FIG. 1, sectors of the one or more neighboring base stations that do not overlap with any sector of base station 105, comprise sector A, sector C and sector E of base station 110, base station 115 and base station 120 and sector B, sector D and sector F of base station 125, base station 130 and base station 135. Therefore, mobile station 160, which belongs to sector E of base station 110, can be scheduled for uplink transmission during the first segment uplink time slot. However, a communication may not be facilitated between bases station 110 and mobile station 165 in the first segment uplink time slot as mobile station 165 is located in sector B of base station 110.

Further, the uplink transmission may be facilitated using the first segment at a predetermined power level. In one embodiment of the present invention, mobile stations in the entire area of sectors other than the one or more predetermined sectors can be scheduled for uplink transmission using the first segment. In another embodiment, to reduce the uplink interference even further, only the mobile stations in the non-overlapping areas of the sectors other than the one or more predetermined sectors are scheduled for uplink transmission using the first segment. For instance, the predetermined power level may be a low power level. In this case, only the mobile stations close to a base station can be scheduled for uplink transmission. Further, if the predetermined power level is a high power level, an uplink transmission from mobile stations in the overlapping areas may also be allowed. For instance, in an embodiment of the present invention, base station 110 can schedule only mobile station 160, which is close to base station 110, for uplink transmission during the first segment uplink time slot. In another embodiment of the present invention, base station 110 can schedule mobile station 160 and mobile station 170 for uplink transmission during the first segment uplink time slot.

Thus, mobile station 150 and mobile station 145 can communicate with base station 105 in the first segment uplink time slot. Similarly, mobile station 160 and mobile station 170 can communicate with base station 110 in the first segment uplink time slot. In the embodiment where only the mobile stations in the non-overlapping area are scheduled, only mobile station 160 may be scheduled for uplink transmission. However, mobile station 165 may not be scheduled for uplink transmission to in the first segment uplink time slot, since mobile station 165 is located in sector B of base station 110, which may have an overlapping area with a base station (not shown in FIG. 1) that uses the first segment for uplink transmission.

Figure 4:
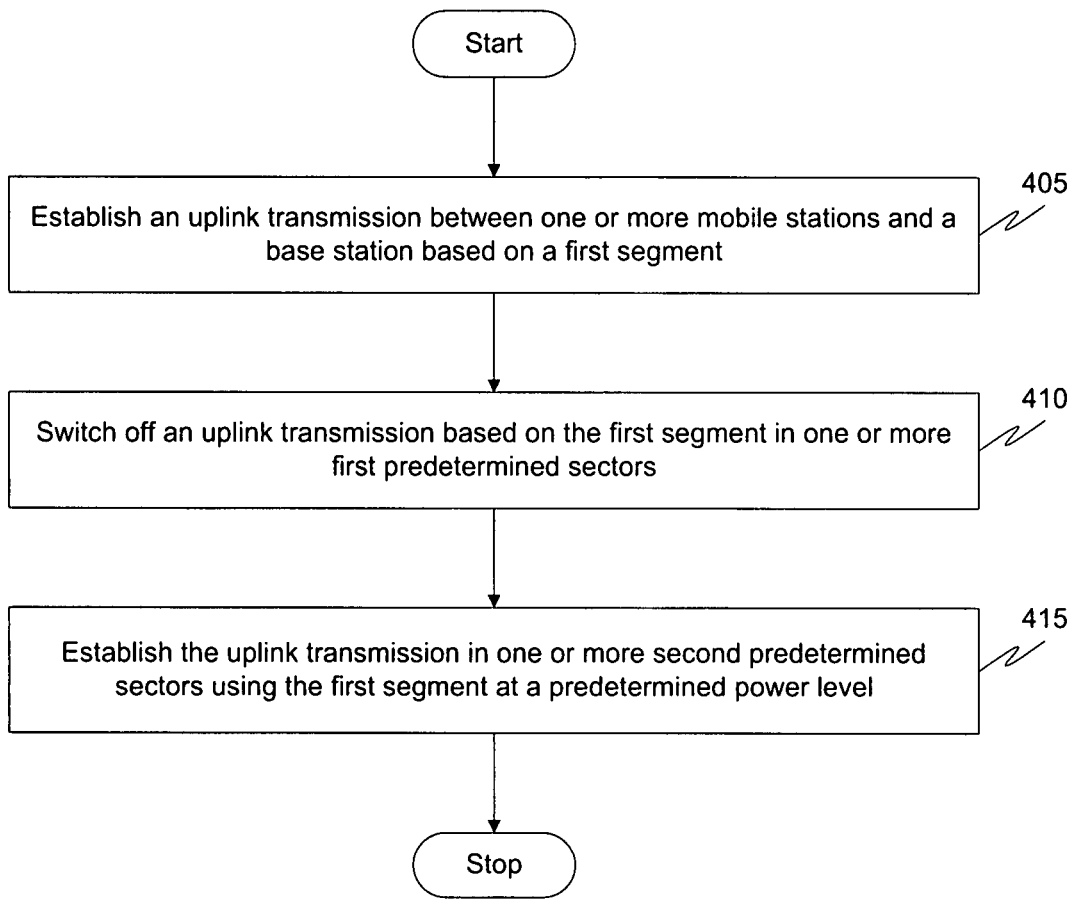
FIG. 4 illustrates a flow diagram of a method for managing an uplink transmission in a FDMA communication network in accordance with an embodiment of the present invention.

Referring now to FIG. 4, a flow diagram of a method for managing an uplink transmission in a FDMA communication network is shown, in accordance with an embodiment of the present invention. As mentioned earlier, a downlink time slot and an uplink time slot is reserved for each segment in the FDMA communication network. At step 405, an uplink transmission based on a first segment is established between one or more mobile stations and a base station in FDMA communication network 100. The one or more mobile stations are located in a cell area of the base station. For instance, base station 105 communicates using the first segment at a high power level. At step 405, an uplink transmission is established between mobile station 150 and/or mobile station 145 and base station 105. As mentioned earlier, the uplink transmission at step 405 is established using the first segment.

Simultaneous uplink transmission can also be established for mobile stations in cell areas of one or more neighboring base stations. However, an uplink transmission based on the first segment is switched off in one or more first predetermined sectors of the one or more neighboring base stations, at step 410. The one or more first predetermined sectors belong to a plurality of sectors are such that, an overlapping is present between at least one of the one or more first predetermined sectors and one or more plurality of sectors of the base station. For instance, when the uplink transmission is established for mobile station 145 and mobile station 150, uplink transmission in sector B, sector D and sector F of base station 125, base station 115 and base station 120 and in sector A, sector C and sector E of base station 125, base station 130 and base station 135 is switched off. Therefore, uplink transmission using first segment for mobile station 165 in sector B of base station 110 is switched off.

Further at step 415, an uplink transmission is established using the first segment at a predetermined power level in sectors other than the one or more predetermined sectors.

These sectors are such that an overlapping is absent between the sectors and each of the plurality of sectors of the base station. For instance, in FDMA communication network 100, the sectors comprise sector A, sector C and sector E of base station 110, base station 115 and base station 120 and sector B, sector D and sector F of base station 125, base station 130 and base station 135. Therefore, at step 415, an uplink transmission is established between mobile station 160 and base station 110. However, an uplink transmission may not be established between mobile station 165 and base station 110.

Further, the uplink transmission may be established on the first segment at a predetermined power level. In an embodiment of the present invention, the predetermined power level is a high power level. In this embodiment, mobile station 160, which is in a non-overlapping area of sector E of base station 110, and mobile station 170, which is in an overlapping area of sector A of base station 110, is able to communicate with base station 110. However, in the embodiment where the predetermined power level is a low power level, only mobile station 160 may be able to communicate with base station 110.

Figure 5:
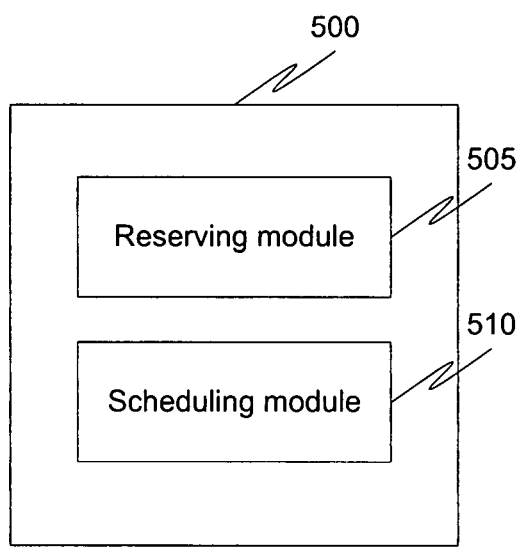
FIG. 5 illustrates a block diagram of a system for managing communication in a FDMA communication network in accordance with an embodiment of the present invention.

Referring now to FIG. 5, a block diagram of a system 500 for managing communication in a FDMA communication network is shown, in accordance with an embodiment of the present invention. System 500 comprises a reserving module 505 and scheduling module 510. Reserving module 505 is configured for reserving a first segment uplink time slot and/or a first segment downlink time slot for a first segment. The first segment belongs to a plurality of segments of FDMA communication network. Similarly, reserving module 505 is also configured for reserving downlink time slots and uplink time slots for the plurality of segments in the FDMA communication network. Downlink transmission using a segment is scheduled for the downlink time slot reserved for that segment. Similarly, uplink transmission using the segment is scheduled for the uplink time slot reserved for that segment.

In an embodiment of the present invention, reserving module 505 is further configured for reserving a low power downlink time slot and a low power uplink time slot. The low power downlink time slot corresponds to a downlink transmission, and the low power uplink time slot corresponds to an uplink transmission using one or more of the plurality of segments at a low power level. During the low power downlink time slot and the low power uplink time slot, some or all of the plurality of segments can be used at a low power level so as to establish communication for mobile stations in the first areas corresponding to the plurality of base stations. Since, communication for only the mobile stations in the first areas of the plurality of base station is facilitated, interference in the downlink transmission and uplink transmission is reduced during the low power downlink time slot and low power uplink time slot. For instance, referring back to FIG. 1, during the low power downlink time slot and the low power uplink time slot, base station 105, base station 110, base station 115, base station 120, base station 125, base station 130 and base station 135 can use the first segment, the second segment and the third segment simultaneously at a low power level so as to communicate with mobile stations located in the first areas of the base stations, for instance mobile station 150, mobile station 160 and mobile station 165.

In another embodiment of the present invention, reserving module 505 further reserves a high power downlink time slot corresponding to a Multicast and Broadcast Service (MBS) symbol. Thus, downlink transmission to mobile stations located in the second areas corresponding to the plurality of base station can be established using any or all of the first segment, the second segment and the third segment during the high power level downlink transmission. For instance, during the high power downlink time slot, mobile station 145 can receive downlink transmission from both base station 105 and base station 110 simultaneously and on any of the first segment, the second segment and the third segment. Further, one or more of mobile station 150, mobile station 160, mobile station 165 and mobile station 170 can receive the downlink transmission during the high power downlink time slot.

Further, scheduling module 510 is configured for scheduling a communication between a base station and one or more mobile stations, based on the first segment downlink time slot and the first segment uplink time slot reserved by reserving module 505. In an embodiment of the present invention, a base station in the FDMA communication network comprises a plurality of antennas. The plurality of antennas are configured to service a plurality of sectors of a cell area of the base station. The plurality of antennas may be adaptively coupled to scheduling module 510.

In an embodiment of the present invention, the plurality of antennas of the base station may use beamforming for servicing the plurality of sectors, such that a beam may be formed in a particular sector of sectors as described. Further, in another embodiment of the present invention, the plurality of antennas may be sectoral antennas. A sectoral antenna may be configured to selectively service a sector of a cell area.

In yet another embodiment of the present invention, the plurality of antennas can be smart antennas. Smart antenna is, typically, used in Space Division Multiple Access (SDMA) systems. The smart antennas are configured to track and locate antenna beams on a mobile station. One or more smart antennas can be used for selectively servicing one or more sectors of the plurality of sectors.

Scheduling module 510 is configured for facilitating the plurality of antennas of the base station to service all of the plurality of sectors using the first segment, during the first segment downlink time slot and the first segment uplink time slot. Scheduling module 510 can enable the plurality of antennas to transmit on the first segment at a high power level during the first segment downlink time slot.

During the first segment downlink time slot, scheduling module 510 facilitates a plurality of antennas of one or more neighboring base stations to service all of a plurality of sectors corresponding to the one or more neighboring base stations, using the first segment at low power level. For instance, scheduling module 510 facilitates antennas of base station 105 to transmit using the first segment with high power level on a downlink sub-frame so as to enable downlink transmission to mobile station 150, as well as to mobile station 145. Simultaneously, scheduling module 510 can facilitate antennas of base station 135 to transmit using the first segment with a low power level on the downlink sub-frame so as to enable downlink transmission only to mobile station in the first areas of the base stations, such as mobile 160 and mobile station 165.

Further, scheduling module 510 is configured to facilitate the plurality of antennas of the base station to service all of the plurality of sectors of the base station, during the first segment uplink time slot. However, the reduce interference, scheduling module 510 is also configured to enable the antennas of the one or more neighboring base stations to switch off communication in one or more predetermined sectors. In an embodiment of the present invention, instead of switching off communication, scheduling module 510 facilitates the plurality of antennas to receive uplink transmission only from mobile stations located very close to the base station in the one or more predetermined sectors. The one or more predetermined sectors are sectors of the one or more neighboring base Referring back to FDMA communication network 100 of FIG. 1, the one or more predetermined sectors, comprise sector B, sector D and sector F, corresponding to each of base station 110, base station 115 and base station 120 and sector A, sector C and sector E, corresponding to each of base station 125, base station 130 and base station 135. Scheduling module 510 is configured for enabling the antennas of base station 110, base station 115 and base station 120 to switch of communication in sector B, sector D and sector F of their cell areas and base station 125, base station 130 and base station 135 to, switch off communication in sector A, sector C and sector E of their cell areas. The power level of the plurality of antennas can be reduced instead of switching them off, so as to receive uplink transmission from mobile stations located very close to base station in the one or more predetermined sectors. Those skilled in the art will realize that the switching off of communication is performed only for the first segment in the first segment uplink time slot. However, the antennas may be functional with respect to other segments in the FDMA communication network.

Further, scheduling module 510 is configured for allowing the antennas of the one or more neighboring base stations to service sectors other than the one or more predetermined sectors, during the first segment uplink time slot. The sectors of the one or more neighboring base stations that can be serviced area sectors for which overlapping is absent between the sectors and each of the plurality of sectors of the base station. The one or more second predetermined sectors may be serviced using the first segment at a predetermined power level. The predetermined power level may be a low power level or a high power level.

For instance, in the first segment uplink time slot mobile station 160, which is located in sector E of base station 110, can be serviced at the predetermined power level. If the predetermined power level is a low power level, scheduling module 510 may not allow the antennas of base station 110 to service mobile station 170. However, if the predetermined power level is a high power level, scheduling module 510 may allow the antennas of base station 110 to service mobile station 170. It will be apparent that uplink interference can be lower when the predetermined power level is the low power level than when the predetermined power level is the high power level.

Various embodiments of the present invention provide method and systems for reducing interference in a FDMA communication system. The method of the present invention, therefore, improves a communication link between neighboring base stations and one or more mobile stations in a FDMA communication network. This helps increasing the Quality of Service for the FDMA communication network. Further, the method of the present invention is easy to implement and stable under heavy service load.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method for managing communication in a Frequency Division Multiple Access (FDMA) communication network, the method comprising:
    reserving at least one of a first segment downlink time slot and a first segment uplink time slot for a first segment in the FDMA communication network, the first segment belonging to a plurality of segments used in the FDMA communication network, the segments representing respective portions of a frequency allocated to the FDMA communication network;
    scheduling a communication between a base station and at least one mobile station based on the at least one of the first segment downlink time slot and the first segment uplink time slot, the base station transmitting the first segment at a high power level for the communication, the high power level transmission being greater than a transmission power level of the plurality of segments, the at least one mobile station located in a cell area of the base station, the cell area being divided into a plurality first of radial sectors, and further located in one of a first area and a second area, the first area being a part of a cell area of the base station where overlapping with at least one neighboring cell area of at least one neighboring base station is absent, and the second area being a part of the cell area of the base station where overlapping with the at least one neighboring cell area of the at least one neighboring base station is present;
    switching off the at least one neighboring base station communication based on the first segment in one or more second radial sectors in the second area, the second radial sectors corresponding to the at least one neighboring base station of the base station, the cell area of the at least one neighboring base station being divided into a plurality second of radial sectors; and
    establishing communication between a base station and at least one mobile station using the first segment.

2. The method of claim 1, wherein at least one of a ranging information and a signal strength information from the base station is used to determined if the at least one mobile station is located in one of a first area and a second area.

3. The method of claim 1, wherein in the first segment downlink time slot and in the first segment uplink time slot, the base station communicates with the at least one mobile station using the first segment, the mobile station belonging to one of the first area and the second area of the base station.

4. The method of claim 1, wherein in the first segment downlink time slot:
    facilitating a communication between the at least one neighboring base station and a first plurality of mobile stations using the first segment in the first segment downlink time slot, the first plurality of mobile stations located in a first area of the at least one neighboring base station, wherein the at least one neighboring base station uses the first segment at a low power level.

5. The method of claim 1 further comprises:
    facilitating a communication between a second plurality of mobile stations and the at least one neighboring base station using the first segment in the first segment uplink time slot, the first segment being used at a predetermined power level, wherein the second plurality of mobile stations are located in one or more second predetermined sectors of the second plurality of sectors, wherein an overlapping is absent between the one or more second predetermined sectors and each of the first plurality of sectors.

6. The method of claim 5, wherein the predetermined power level is one of a low power level and a high power level.

7. The method of claim 1, wherein the reserving further comprises reserving a low power level downlink time slot and a low power level uplink time slot, wherein each of the plurality of segments in the FDMA communication network is used at a low power level.

8. The method of claim 1, wherein the reserving further comprise reserving a high power level downlink time slot, wherein each of the plurality of segments in the FDMA communication network is used at a high power level, the high power downlink time slot corresponding to a Multicast and Broadcast Service (MBS) symbol.

9. The method of claim 1, wherein the FDMA communication network is a Orthogonal FDMA (OFDMA) communication network.

10. A method for managing an uplink transmission in a Frequency Division Multiple Access (FDMA) communication network, the method comprising:
  establishing an uplink transmission between at least one mobile station and a base station based on a first segment, the first segment belonging to a plurality of segments in the FDMA communication network, the segments representing respective portions of a frequency allocated to the FDMA communication network, the at least one mobile station located in a cell area of the base station, the cell area being divided into a plurality of first radial sectors;
  switching off an uplink reception based on the first segment in one or more second radial sectors corresponding to at least one neighboring cell area of at least one neighboring base station, wherein an overlapping is present between at least one of the plurality of first radial sectors and at least one of the second radial sectors; and
  establishing the uplink transmission in one or more second radial sectors using the first segment at a predetermined power level, the one or more second radial sectors belonging to the second plurality of radial sectors, wherein an overlapping is absent between the one or more second radial sectors and each of the plurality of first radial sectors.

11. A system for managing communication in a Frequency Division Multiple Access (FDMA) communication network, the system comprising:
  a reserving module, the reserving module configured to reserve at least one of a first segment downlink time slot and a first segment uplink time slot for a first segment in the FDMA communication network, the first segment belonging to a plurality of segments used in the FDMA communication network, the segments being portions of a frequency allocated to the FDMA communications network; and
  a scheduling module, the scheduling module configured to:
    schedule a communication between a base station and at least one mobile station based on the at least one of the first segment downlink time slot and the first segment uplink time slot, the base station using the first segment at a high power transmission level for the communication, the high power level transmission being greater than a transmission power level of the plurality of segments, the at least one mobile station located in a cell area of the base station, the cell area being divided into a plurality first of radial sectors, and further located in one of a first area and a second area, the first area being a part of a cell area of the base station where overlapping with at least one neighboring cell area of at least one neighboring base station is absent, and the second area being a part of the cell area of the base station where overlapping with the at least one neighboring cell area of the at least one neighboring base station is present;
    enabling a plurality of antennas to:
  switch off the at least one neighboring base station communication based on the first segment in one or more second radial sectors in the second area, a plurality of second radial sectors corresponding to the at least one neighboring base station of the base station; and
  establish communication between a base station and at least one mobile station using the first segment.

12. The system of claim 11, wherein the reserving module is further configured to reserve a low power level downlink time slot and a low power level uplink time slot, wherein each of the plurality of segments in the FDMA communication network is used at a low power level.

13. The system of claim 11, wherein the reserving module is further configured to reserve a high power level downlink time slot, wherein each of the plurality of segments in the FDMA communication network is used at a high power level, the high power downlink time slot corresponding to a MBS symbol.

14. The system of claim 11, wherein the scheduling module is further configured to:
  facilitate the first plurality of antennas to service the first plurality of sectors using the first segment at a high power level, in the first segment downlink time slot and in the first segment uplink time slot; and
  facilitate a second plurality of antennas to service the second plurality of sectors using the first segment at a low power level, in the first segment downlink time slot.

15. The system of claim 14, wherein the scheduling module is further configured to:
  allow the second plurality of antennas to service one or more second predetermined sectors of the second plurality of radial sectors in the first segment uplink time slot, the first segment being used at a predetermined power level, wherein an overlapping is absent between the one or more second predetermined sectors and each of the first plurality of sectors.

16. The method of claim 10, wherein establishing the uplink transmission between at least one mobile station and a base station based on a first segment comprises:
  establishing communication between the at least one mobile station and the base station using the first segment at a high power level.

17. The method of claim 10, wherein the predetermined power level comprises one of a high power level or a low power level, wherein if the predetermined power level includes the high power level, establishing communication between the at least one neighboring base station and mobile stations in a non-overlapping area and an overlapping area of the one or more second sectors, and wherein if the predetermined power level includes the low power level, establishing communication between the at least one neighboring base station and mobile stations in a non-overlapping area of the one or more second sectors.

* * * * *